United States Patent Office 2,909,537
Patented Oct. 20, 1959

2,909,537
DRYING OILS

Herbert Walter Chatfield, Croydon, England, assignor to A. Boake, Roberts & Company Limited, London, England No Drawing. Application November 4, 1957
Serial No. 694,073

Claims priority, application Great Britain November 14, 1956

6 Claims. (Cl. 260—405)

This invention relates to compounds obtained from drying oil acids having improved properties over drying oils when used in coating compositions.

In our co-pending application No. 8540/56 coating compositions are described having corrosion inhibiting properties which are obtained by adding to an oleo-resinous coating composition an epoxidised oil or by reducing the unsaturation in the drying oil component used in making the oleo-resinous composition by forming epoxy groups across the double bonds of said drying oil component.

Epoxidised oils are defined in our co-pending application as meaning oils which have an iodine value not less than about 80 or the acids derived from the said oils in which the unsaturation has been partly or wholly removed by the formation of epoxy groups across the double bonds. Preferably the oils employed are those which do not contain a high proportion of conjugated double bond constituents because these constituents are not so easily epoxidised.

We have now found that drying oil fatty acids can be made to react with these epoxidised oils and furthermore that the reaction is not restricted to the glyceride type of epoxidised esters but is applicable to esters of drying oil fatty acids with still higher polyhydric alcohols than glycerol. Consequently the term "epoxidised ester" as used in this specification is intended to mean esters of glycerol and higher polyhydric alcohols with acids of the above mentioned oils in which the unsaturation has been partly or wholly removed by the formation of epoxy groups across the double bonds, for example, by treating the said esters with hydrogen peroxide in the presence of formic or acetic acids.

Furthermore the reaction is not restricted to reactions of the said epoxidised esters with drying oil acids but the expression "drying oil fatty acid" as used in this specification is intended to include the acids of semi drying oils and mixtures of drying and/or semi drying oil acids with non-drying oil acids.

According to the present invention a process for the production of improved drying oil compounds comprises heating the acids of a drying oil as above defined with an epoxidised ester as above defined until a reduction of the acid value of the mixture has been attained.

According to a preferred feature of the invention the mixture of drying oil acids and epoxidised ester is heated to a temperature of the order of 230° C. until the required acid value has been attained.

The invention is more particular concerned with the production of reaction products of epoxidised drying oils with drying oil fatty acids.

It has been found possible to identify two stages of reaction which may occur according to the following mechanism at the epoxy grouping as indicated below:

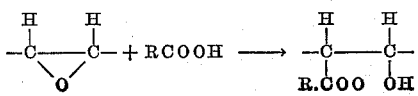

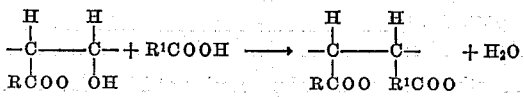

The following examples illustrate the nature of the invention and indicate that the reaction between the two reactants proceeds substantially according to the two-stage process indicated above the parts indicated being parts by weight:

Example 1

This example shows the effect of heating an epoxidised oil with a minor proportion of a drying oil acid.

| | Parts |
|---|---|
| Epoxidised soya bean oil | 150 |
| Linseed oil fatty acids | 50 |

After heating the mixture for 1 hr. at 230° C. the acid value was reduced to 0.3.

Example 2

This example illustrates the effect on the acid value of heating a larger proportion of linseed oil fatty acids than that used in Example 1 for different periods of time.

| | Parts |
|---|---|
| Epoxidised soya bean oil | 150 |
| Linseed oil fatty acids | 100 |

The acid value after 1 hr. heating at 230° C. was reduced to 6.4 and after a further hour the acid value was reduced to 3.8.

Example 3

A mixture of equal proportions by weight of epoxidised soya bean oil and linseed oil fatty acids was heated at a temperature of 230° C. and the acid value of samples taken after the following periods was determined:

After:
- 1 hr. _____ 14.9
- 2 hrs. _____ 10.2
- 3 hrs. _____ 7.6
- 4 hrs. _____ 5.6

Example 4

Example 3 was repeated with more linseed oil fatty acids the proportions being as follows:

| | Parts |
|---|---|
| Epoxidised soya bean oil | 150 |
| Linseed oil fatty acids | 225 |

After 1 hr. heating at 230° C. the acid value was found to be 38.4 and after 4 hrs. it was found to be 12.8.

Example 5

In this example the proportion of linseed oil fatty acids was twice the proportion of epoxidised linseed oil and after 6 hrs. heating at 230° C. the acid value was found to be 17.2.

The products obtained from Example 3 and 4 above were compared with 50 poise viscosity linseed stand oil for drying properties and physical film characteristics and the films obtained with the products of Examples 3 and 4 were found to set more rapidly and to give tougher coatings with improved surface hardness and reduced residual tack than those obtained with linseed stand oil.

Example 6

A mixture of equal proportions by weight of epoxidised oil and dehydrated castor oil fatty acids was heated at 230° C. for 3 hours approximately until the acid value had fallen to 12.0.

Example 7

Example 6 was repeated with more dehydrated castor oil fatty acids, the proportions being:

| | Parts |
|---|---|
| Epoxidised oil | 150 |
| Dehydrated castor oil for fatty acids | 225 |

A rather longer time of processing at 230° C. i.e. about 3½–3¾ hours was necessary in order to achieve an acid value below 30.

These products were compared with a dehydrated castor oil stand oil of 50 poise viscosity and were found to dry much more rapidly and yield films with less residual tack.

The products obtained by the interaction of drying oil fatty acids with epoxidised glyceride oils were found to be viscous oils with useful drying properties and it is believed that other epoxidised esters as hereinbefore enumerated will give similar useful drying properties.

The improved drying oil compounds of the present invention are particularly useful as constituents in anti-corrosion stoving primers. As is well known red oxide of iron is used extensively in anti-corrosion stoving primers but its anti-corrosion activity is of a comparatively low order and the overall anti-corrosion properties often have to be augmented by the addition of other more powerful anti-corrosion agents, for example, zinc chromate. The synthetic oil derived from the interaction of epoxidized soya bean oil and linseed oil fatty acids has good drying properties yielding tough coatings with good surface hardness and it also provides a measure of protection against corrosion and it has been found that it makes up for the deficiencies of red oxide of iron without the necessity of adding other more powerful anti-corrosion agents.

In support of the above the following test was made with a synthetic oil obtained by the interaction of equal parts of epoxidised soya bean oil and linseed oil fatty acids at a temperature of 230° C. for four hours and a primer was made up containing the following constituents only:

| | Parts |
|---|---|
| The aforementioned synthetic oil | 80 |
| Red oxide of iron | 50 |
| Asbestine | 30 |
| White spirit | 40 | to a viscosity of 65 secs. B.S.S. cup at 25° C. Two samples were made up of the above composition, one containing 0.5% of 3% cobalt driers and the other without any drier and coatings of these two samples were applied to bright steel and stove-dried at 350° F. for 30 minutes. In both cases good tough coatings with good adhesion were obtained and both had scratch resistance figures of about 2500 gms. The stoved samples were then exposed in a weatherometer for 355 hours and 240 hours respectively and were then examined for corrosion, but in neither case was any blistering or corrosion observed.

These results indicate the possibility of using the synthetic oils of the present invention as a basis for a stoving anti-corrosion primer free of resin and drier and the more powerful anti-corrosion pigments.

The products according to the present invention therefore are believed to be useful and improved alternatives to the conventional drying oils for use in coatings and impregnating compositions wherever drying oils are at present used.

I claim:

1. A process for the production of improved drying oil compounds, which comprises heating an acid mixture derived from an oil selected from the group consisting of drying and semi-drying oils, mixtures of drying oils with non-drying oils and mixtures of semi-drying oils with non-drying oils, together with an epoxidised ester selected from the group consisting of the glyceride and higher polyhydric alcohol esters of acids having an iodine value not less than 80 in which the unsaturation has been at least partially removed by the formation of epoxy groups across the double bonds and continuing the said heating until a reduction of the acid value of the mixture has been attained.

2. A process for the production of improved drying oil compounds, which comprises heating at 230° C. an acid mixture derived from an oil selected from the group consisting of drying the semi-drying oils, mixtures of drying oils with non-drying oils and mixtures of semi-drying oils with non-drying oils, together with an epoxidised ester selected from the group consisting of the glyceride and higher polyhydric alcohol esters of acids having an iodine value not less than 80 in which the unsaturation has been at least partially removed by the formation of epoxy groups across the double bonds and continuing the said heating until a reduction of the acid value of the mixture has been attained.

3. A process for the production of improved drying oil compounds, which comprises heating the acids derived from linseed oil with a soya bean oil in which the unsaturation has been at least partially removed by the formation of epoxy groups across the double bonds.

4. A process as claimed in claim 1, wherein the epoxy groups have been formed in the epoxidised ester by treatment of the ester with hydrogen peroxide in the presence of an acid selected from the group consisting of formic and acetic acids.

5. A process as claimed in claim 2, wherein the epoxy groups have been formed in the epoxidised ester by treatment of the ester with hydrogen peroxide in the presence of an acid selected from the group consisting of formic and acetic acids.

6. A process as claimed in claim 3, wherein the epoxy groups have been formed in the soya bean oil by treatment thereof with hydrogen peroxide in the presence of an acid selected from the group consisting of formic and acetic acids.

References Cited in the file of this patent

UNITED STATES PATENTS

| 2,660,563 | Banes et al. | Nov. 24, 1953 |
| 2,752,376 | Julian et al. | June 26, 1956 |